United States Patent

Chin et al.

[11] Patent Number: 5,366,761
[45] Date of Patent: Nov. 22, 1994

[54] METHOD FOR PREPARING BARIUM-FERRITE-COATED $\gamma\text{FE}_2\text{O}_3$ MAGNETIC POWER

[75] Inventors: Tsung-Shune Chin; Sung-Lin Hsu; Ming-Cheng Deng, all of Hsinchu, Taiwan, Prov. of China

[73] Assignee: National Science Council, Taipei, Taiwan, Prov. of China

[21] Appl. No.: 76,074

[22] Filed: Jun. 11, 1993

[51] Int. Cl.$^5$ ............................................... B05D 5/12
[52] U.S. Cl. ............................ 427/127; 427/215; 427/372.2; 427/379; 427/380; 148/105; 75/349; 75/350
[58] Field of Search .................. 427/127, 215, 372.2, 427/379, 380; 148/105; 75/349, 350

[56] References Cited

U.S. PATENT DOCUMENTS

| | | | |
|---|---|---|---|
| 4,050,962 | 9/1977 | Koester et al. | 427/127 |
| 4,178,171 | 12/1979 | Steck et al. | 75/350 |
| 4,305,753 | 12/1981 | French | 75/349 |

OTHER PUBLICATIONS

M. P. Sharrock, "Particulate Recording Media", in: MRS Bulletin, vol. XV, Mar. 1990 pp. 53–61.
M. P. Sharrock, "Particulate Magnetic Recording Media: A Review", in: IEEE Trans. Magn. MAG-23, No. 1, pp. 4374–4389, Nov. 1989.
A. Eiling, "Co–Modified Pigments In Magnetic Recording", in: IEEE Trans. Magn. MAG-25, pp. 16–21, no date available.

*Primary Examiner*—Shrive Beck
*Assistant Examiner*—David M. Maiorana
*Attorney, Agent, or Firm*—Townsend and Townsend Khourie and Crew

[57] ABSTRACT

A method for preparing a barium-ferrite-coated, needle-shaped $\gamma\text{-Fe}_2\text{O}_3$ magnetic powder of better properties is provided. The method includes the following steps of a) letting an iron-containing solution undergo a reaction to precipitate a needle-shaped $\alpha\text{-FeOOH}$ phase powder, b) mixing said $\alpha\text{-FeOOH}$ powder into a barium-containing solution in a predetermined Fe/Ba ratio, c) filtering without washing the precipitated powder, and d) subjecting the precipitated powder to heat treatments including calcination, reduction and oxidation.

24 Claims, 2 Drawing Sheets

METHOD FOR PREPARING BARIUM-FERRITE-COATED γFE₂O₃ MAGNETIC POWER

BACKGROUND OF THE INVENTION

The present invention relates generally to a method for preparing a $\gamma$-Fe$_2$O$_3$ magnetic powder, and more particularly to a convenient method for preparing a cheaper needle-shaped $\gamma$-Fe$_2$O$_3$ magnetic powder with a Ba-ferrite coating.

Magnetic recording is widely used in the computer-related products, such as magnetic tapes, and audio/video recording tapes. In prior audio applications, the $\gamma$-Fe$_2$O$_3$ having a coercivity of 200–400 Oe is generally used. In prior video applications, the Co-$\gamma$-Fe$_2$O$_3$ having a coercivity of 600–800 Oe is generally used. However, the Co-$\gamma$-Fe$_2$O$_3$ is unsuitable for high density recording because its coercivity cannot reach as high as 1500 Oe as required for high density recording purposes. For the demand of the new generation of particulate high density recording materials, such as in video and data storages, the magnetic powder having higher coercivity and smaller particle size needs to be studied and developed. Ba-ferrite magnetic powder is a candidate taken into consideration for those purposes (with respect to which reference is made to M. P. Sharrock, MRS Bulletin, Vol. XV, March 1990, P. 53).

However, the above-mentioned particulate recording media have the following drawbacks:

(a) The temperature coefficient of coercivity of the $\gamma$-Fe$_2$O$_3$ with cobalt additive is very high. In A. Eiling's article, IEEE Trans. Magn., MAG-23, No. 1, P. 16(1987), it is disclosed that the temperature coefficient of coercivity of the $\gamma$-Fe$_2$O$_3$ (with Hc=650 Oe) with an outer cobalt coating is $-0.46\%/°$ C. while the temperature coefficient of the $\gamma$-Fe$_2$O$_3$ (with Hc=700 Oe) with cobalt additive is $-0.71\%/°$ C. In M. P. Sharrock's article, IEEE Trans. Magn., MAG-25, P. 4374 (1989), it is disclosed that the temperature coefficient of coercivity of the $\gamma$-Fe$_2$O$_3$ with cobalt additive is $-1.00\%/°$ C. while the temperature coefficient of the $\gamma$-Fe$_2$O$_3$ with an outer cobalt coating is from $-0.2$ to $-0.5\%/°$ C.

(b) The metallic powders have a serious dispersion problem, and are easily suffered from oxidation and corrosion, resulting in instability of properties.

(c) The coercivity of the Ba-ferrite magnetic powder is too high, usually 4000–5000 Oe. The lowering of the coercivity thereof by dopants also lowers the saturation and residual magnetization thereof. In addition, there also is a dispersion problem.

The present invention intends to alleviate the drawbacks of the high temperature coefficient (from $-0.2$ to $-1.0\%/°$ C.) and low coercivity (under 1000 Oe) of the conventional needle-shaped $\gamma$-Fe$_2$O$_3$ with cobalt additive (or with an outer cobalt coating).

SUMMARY OF THE INVENTION

The primary objective of the present invention is to provide a method for preparing a barium ferrite-coated $\gamma$-Fe$_2$O$_3$ magnetic powder, which can significantly lower the temperature coefficient of coercivity of the $\gamma$-Fe$_2$O$_3$ magnetic powder.

Another objective of the present invention is to provide a method for preparing a specific $\gamma$-Fe$_2$O$_3$ magnetic powder, which can significantly increase the coercivity of the $\gamma$-Fe$_2$O$_3$ magnetic powder by coating with barium ferrite.

Yet another objective of the present invention is to provide a method for preparing a cost-effective $\gamma$-Fe$_2$O$_3$ magnetic powder coated by barium ferrite.

In accordance with the present invention, a method for preparing $\gamma$-Fe$_2$O$_3$ magnetic powder includes the following steps: (a) letting an iron-containing solution undergo a reaction to precipitate a needle-shaped $\alpha$-FeOOH precipitate; and (b) dipping the $\alpha$-FeOOH precipitate into a barium containing solution in a predetermined ratio, (c) fittering without washing then drying the precipitate, and (d) heat-treating the precipitate.

In accordance with one aspect of the present invention, the iron-containing solution may be a FeCl$_2$ solution of about 0.5M, and the step (a) can be a step of utilizing a NaOH solution to precipitate the $\alpha$-FeOOH from the iron-containing solution.

In accordance with another aspect of the present invention, the NaOH solution is an aqueous solution of about 2.5M, and the iron-containing solution and the NaOH aqueous solution are mixed speedily in substantially equal volume. The step (a) further includes sub-steps of introducing an air bubble during the mixture of the iron-containing and the NaOH solutions for about 200 minutes in order to precipitate the needle-shaped $\alpha$-FeOOH, washing the $\alpha$-FeOOH powder with a de-ionized water, and filtering and stoving the $\alpha$-FeOOH powder.

In accordance with yet another aspect of the present invention the barium-containing solution may be a Ba(NO$_3$)$_2$ solution of about 0.1–0.3M, and the volume of the Ba(NO$_3$)$_2$ solution is adequately selected to let the Fe/Ba mole ratio of the $\alpha$-FeOOH powder be about from 8 to 50, preferably about from 10 to 44. The step (b) includes sub-steps of applying an ultrasonic vibration at about 25° C. for about 20 minutes, and then filtering without washing and stoving the needle-shaped barium-bearing $\alpha$-FeOOH magnetic powder.

In accordance with further aspect of the present invention, the stoved barium-bearing $\alpha$-FeOOH powder is further undergone a first heat treatment process of heating at about 810°–890° C., preferably at about 840°–880° C., in air for about 1–16 hours, preferably about 4–14 hours. The resultant phases after the first heat treatment process include Ba-ferrite magnetic phase, and $\alpha$-Fe$_2$O$_3$ phase. The method of the present invention further includes a second heat treatment process, following the first heat treatment process, of being reduced at about 280°–270° C., preferably at about 300°–350° C., in a flowing gas of hydrogen and nitrogen (being 1:1) and being saturated with water vapor at a rate of 1 to 15 ml/min, preferably 2 to 9 ml/min, for about 0.5–3 hours, preferably about 1–2 hours. The method of the present invention further includes a third heat treatment process, following the second heat treatment process, of oxidation at about 330°–390° C., preferably at about 340°–380° C., in air for 1–5 hours, preferably 2–3 hours. The finally obtained magnetic powder after the third heat treatment process has a coercivity of about 330–3600 Oe, a saturation magnetization of about 47–70 emu/g, a squareness ratio of about 0.46–0.61 before being magnetically aligned, a particle size of about 100–200 nm, an aspect ratio of about 3–8, and a temperature coefficient of coercivity of about from $-0.07$ to $-0.1\%/°$ C., and includes the $\gamma$-Fe$_2$O$_3$ phase and the Ba-ferrite magnetic phase. The coercivity and saturation magnetization of the finally obtained magnetic powder can be modified by the adjustment of Fe/Ba ratio and/or the conditions of the first, second, and third heat treatment processes.

The present invention can be more fully understood by reference to the following description and accompanying drawings, which form an integral part of this application:

DETAILED DESCRIPTION OF THE PREFERRED EMBODIMENTS

The present invention combines the characteristics of the $\gamma$-$Fe_2O_3$ and barium ferrite magnetic phases together. The temperature coefficient of coercivity of the barium ferrite which is coated on the surface of $\gamma$-$Fe_2O_3$ is positive, and thus can compensate the negative temperature coefficient of the $\gamma$-$Fe_2O_3$ to significantly lower the entire temperature coefficient of coercivity. The high coercivity (higher than 4000 Oe) characteristic of the barium ferrite can also significantly increase the entire coercivity.

The method for preparing a barium ferrite- coated $\gamma$-$Fe_2O_3$ magnetic powder according to the present invention includes the following steps: (a) letting an iron- containing solution undergo a reaction to precipitate a needle-shaped $\alpha$-FeOOH precipitate; (b) dipping the $\alpha$-FeOOH powder into a barium-containing solution to form a predetermined Fe/Ba ratio: (c) filtering without washing and stoving the precipitate; and (d) heat-treating the precipitate to form a needle-shaped $\gamma$-$Fe_2O_3$ magnetic powder with barium ferrite coated on its surface. In the step (a), a 2.5M NaOH solution may be added to let the iron-containing solution undergo the precipitation reaction, and the iron-containing solution may be a 0.5M $FeCl_2$ solution. The two solutions are speedily mixed in equal volume at room temperature, and an air bubble is introduced therein for the solutions to react for 200 minutes so as to precipitate the needle-shaped $\alpha$-FeOOH phase precipitate. The $\alpha$-FeOOH precipitate is cleaned up with a deionized water, filtered, and stoved. The powder is then dipped in a $Ba(NO_3)_2$ aqueous solution having a concentration of 0.1–0.3M, and the volume of the aqueous solution is adequately selected to let the Fe/Ba mole ratio thereof be from 8 to 50, preferably from 10 to 44. Then, an ultrasonic vibration is applied to the powder-containing solution to facilitate the reaction at 25° C. for 20 minutes, filter the powder without water cleaning, and stove the powder.

Figure 1:
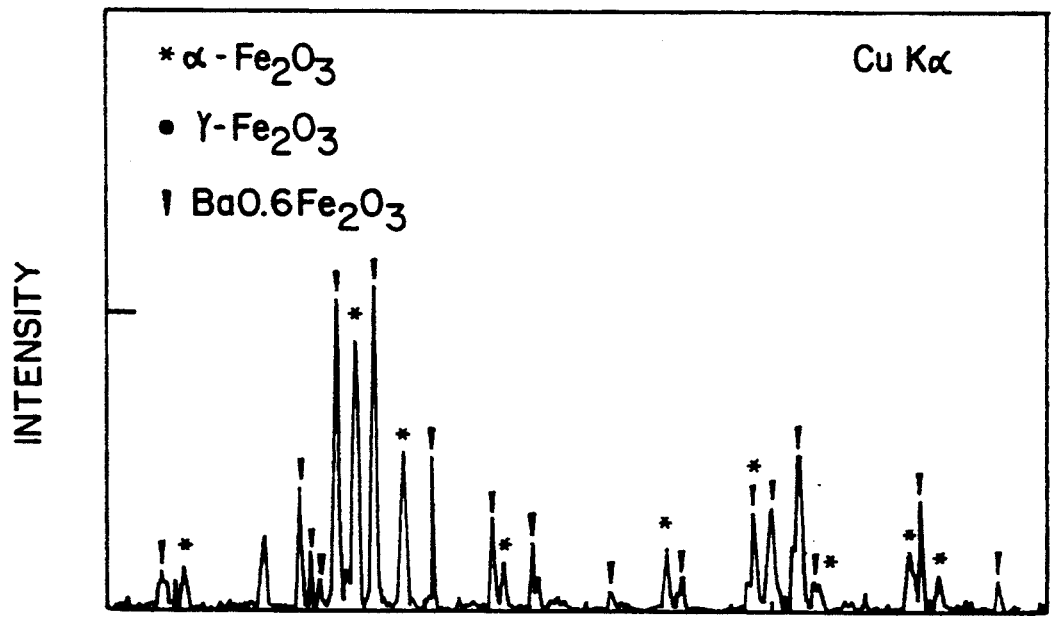
FIG. 1 is an X-ray diffraction pattern of a powder obtained after the first heat treatment according to the present invention.

The above resultant powder is subjected to a first heat treatment process of calcining at 810°–890° C., preferably at 840°–880° C., in air for 1–16 hours, preferably 4–14 hours. The phases of the powder after the first heat treatment process include the Ba-ferrite phase and $\alpha$-$Fe_2O_3$ phase, as shown in FIG. 1. The powder is further subjected to a second heat treatment process of being reduced for the $\alpha$-$Fe_2O_3$ at 280°–360° C. preferably at 300°–340° C., in a flowing gas of hydrogen and nitrogen (being in a ratio of 1:1), and being saturated with water vapor at a flow-rate of 1to 15 ml/min, preferably 2 to 9 ml/min, for 0.5-3 hours, preferably 1–2 hours. Then, the powder is subjected to a third heat treatment process of being oxidized at 330°–390° C., preferably at 350°–380° C., in air for 1–5 hours, preferably 2–3 hours.

The finally obtained powder has a coercivity of 330–3600 Oe, a saturation magnetization of 47–70 emu/g, a squareness ratio of 0.46–0.61 before being magnetically aligned, a particle size of 100–200 nm, an aspect ratio of 3–8, and a temperature coefficient of coercivity of from −0.07 to −0.1%/° C.

Figure 2:
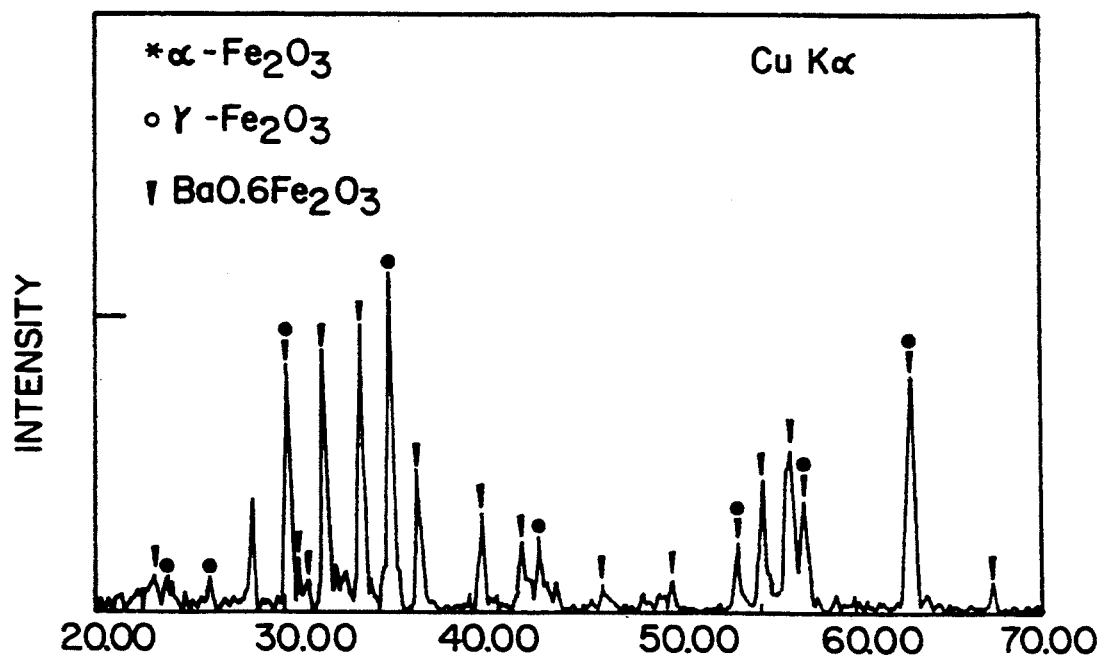
FIG. 2 is an X-ray diffraction pattern of a powder obtained after three heat treatments according to the present invention.

The powder after the third heat treatment process includes the $\gamma$-$Fe_2O_3$ phase and Ba-ferrite magnetic phase, as shown in FIG. 2. The coercivity and saturation magnetization can be modified by adjustment of the Ba/Fe ratio and/or the conditions of the heat treatments.

It can be appreciated from the above description that the present invention only needs simple equipments, and can prepare a barium ferrite-coated $\gamma$-$Fe_2O_3$ magnetic recording medium having a better performance than other $\gamma$-$Fe_2O_3$ based media prepared by prior art.

In order to further understand the barium-ferrite-coated needle-shaped $\gamma$-$Fe_2O_3$ magnetic powder, several examples are described hereinafter.

EXAMPLE 1

Speedily mix a 0.5M $FeCl_2$ solution with a 2.5M NaOH aqueous solution in equal volume at room temperature, and introduce the air bubble therein for the solutions to react for 200 minutes so as to precipitate a needle-shaped $\alpha$-FeOOH phase precipitate. Then, wash and dry the $\alpha$-FeOOH precipitate. Dip the obtained $\alpha$-FeOOH powder of 0.5 g in a 0.3M, 50 ml $Ba(NO_3)_2$ aqueous solution, apply an ultrasonic vibration thereto for 20 minutes, filter it, without washing and stove it. Then, the obtained powder is subjected to a first heat treatment process of being calcined at 860° C. in air for 12 hours. The resultant powder has a saturation magnetization of 46.8 emu/g, a coercivity of 5530 Oe, and a squareness ratio of 0.50. The resultant powder is subjected to a second heat treatment process of being reduced at 350° C. in a flowing gas of hydrogen and nitrogen (being in a ratio of 1:1), and being saturated with water vapor at a flow-rate of 8 ml/min for 1 hour, and then a third heat treatment process of being oxidized at 350° C. in air for 2 hours to obtain a barium-ferrite-coated, needle-shaped $\gamma$-$Fe_2O_3$ magnetic powder. The obtained magnetic powder has a saturation magnetization 62.6 emu/g, a coercivity of 2700 Oe, and a squareness ratio of 0.48 before being magnetically aligned.

EXAMPLE 2

As in example 1, only the concentration of the $Ba(NO_3)_2$ solution is changed to 0.28M, and the processing steps are kept unchanged. The resultant powder after the first heat treatment process has a saturation magnetization of 29.6 emu/g, a coercivity of 4700 Oe, and a squareness ratio of 0.51. If the conditions of the second and third heat treatment processes are kept unchanged, the thereafter obtained barium-ferrite-coated, needle-shaped $\gamma$-$Fe_2O_3$ magnetic powder has a saturation magnetization of 46.4 emu/g, a coercivity of 3600 Oe, and a squareness ratio of 0.49 before being magnetically aligned. If the temperature of the second heat treatment process is changed to 360° C. (by keeping the third heat treatment unchanged), the saturation magnetization will be 52.8 emu/g, the coercivity will be 2920 Oe, and the squareness ratio before being magnetically aligned will be 0.48. If the temperature of the second heat treatment process is changed to 370° C., the saturation magnetization will be 47.2 emu/g, the coercivity will be 3200 Oe, and the squareness ratio before being magnetically aligned will be 0.50.

EXAMPLE 3

Figure 3:
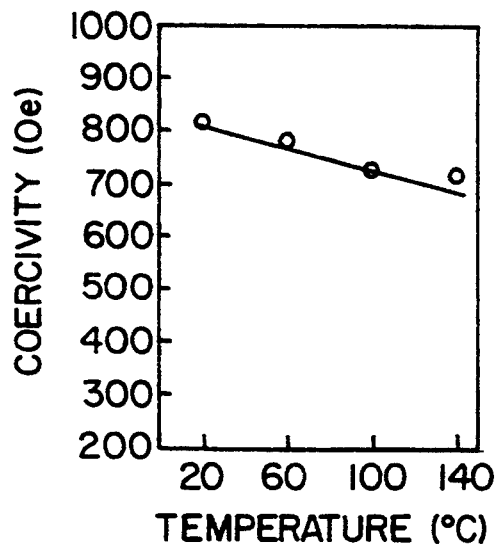
FIG. 3 is a coercivity-temperature diagram of a magnetic powder according to one embodiment of the present invention.

As in example 1, only the concentration of the Ba($NO_3)_2$ solution is changed to 0.26M, and the processing steps are kept unchanged. The resultant powder after the first heat treatment process has a saturation magnetization of 34.5 emu/g, a coercivity of 5400 Oe, and a squareness ratio of 0.52 before being magnetically aligned. If the reaction temperature of the second heat treatment process is changed to 360° C., and the other conditions are kept unchanged, the obtained barium-ferrite-coated, needle-shaped $\gamma$-$Fe_2O_3$ magnetic powder will have a saturation magnetization of 62.8 emu/g, a coercivity of 870 Oe, and a squareness ratio of 0.43 before being magnetically aligned. The relationship between its coercivity and temperature is shown in FIG. 3, and its temperature coefficient of coercivity is $-0.1\%/°$ C. If the temperature of the second heat treatment process is changed to 370° C., the saturation magnetization of the obtained powder will be 54.5 emu/g, the coercivity will be 950 Oe, and the squareness ratio before being magnetically aligned will be 0.49.

EXAMPLE 4

As in example 1, only the concentration of the Ba($NO_3)_2$ solution is changed to 0.25M, and the processing steps are kept unchanged. The resultant powder after the first heat treatment process had a saturation magnetization of 30.0 emu/g, a coercivity of 4050 Oe, and a squareness ratio of 0.51 before being magnetically aligned. If the conditions of the second and third heat treatment processes are kept unchanged, the obtained barium-ferrite-coated, needle-shaped $\gamma$-$Fe_2O_3$ magnetic powder will have a saturation magnetization of 54.6 emu/g, a coercivity of 1500 Oe, and a squareness ratio of 0.48 before being magnetically aligned. If the temperature of the second heat treatment process is changed to 360° C., the saturation magnetization of the obtained powder will be 66.3 emu/g, the coercivity will be 840 Oe, and the squareness ratio before being magnetically aligned will be 0.47. If the temperature of the second heat treatment process is changed to 370° C., the saturation magnetization of the obtained powder will be 56.9 emu/g, the coercivity will be 1060 Oe, and the squareness ratio before being magnetically aligned will be 0.48.

EXAMPLE 5

Figure 4:
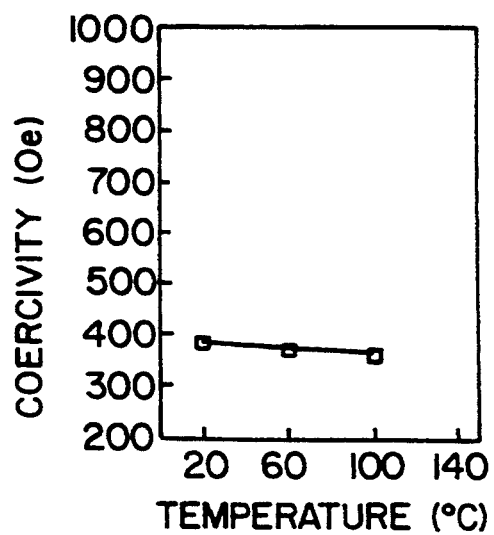
FIG. 4 is a coercivity-temperature diagram of a magnetic powder according to another embodiment of the present invention.

As in example 1, only the concentration of the Ba($NO_3)_2$ solution is changed to 0.2M, and the processing steps are kept unchanged. The resultant powder after the first heat treatment process has a saturation magnetization of 26.1 emu/g, a coercivity of 5100 Oe, and a squareness ratio of 0.52. If conditions of the second and third heat treatment processes are kept unchanged, the obtained barium-ferrite-coated, needle-shaped $\gamma$-$Fe_2O_3$ magnetic powder will have a saturation magnetiaction of 47.9 emu/g, a coercivity of 1300 Oe, and a squareness ratio of 0.50 before being magnetically aligned. If the temperature of the second heat treatment process is changed to 360° C., the saturation magnetization will be 69.6 emu/g. the coercivity will be 370 Oe, and the squareness ratio before being magnetically aligned will be 0.48. The relationship between its coercivity and temperature is shown in FIG. 4, and its temperature coefficient of coercivity is $-0.07\%/°$ C.

EXAMPLE 6

As in example 1, only the concentration of the Ba($NO_3)_2$ solution is changed to 0.1M, and the processing steps are kept unchanged. The resultant powder after the first heat treatment process has a saturation magnetization of 16.2 emu/g, a coercivity of 5300 Oe, and a squareness ratio of 0.48. If the conditions of the second and third heat treatment processes are kept unchanged, the obtained barium-ferrite-coated, needle-shaped $\gamma$-$Fe_2O_3$ magnetic powder has a saturation magnetiaction of 56.3 emu/g, a coercivity of 570 Oe, and a squareness ratio of 0.61 before being magnetically aligned. If the temperature of the second heat treatment process is changed to 360° C., the saturation magnetization will be 62.7 emu/g, the coercivity will be 330 Oe, and the squareness ratio before being magnetically arranged will be 0.46.

While the invention has been described in terms of what are presently considered to be the most practical and preferred embodiments, it is to be understood that the invention needs not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What we claim is:

1. A method for preparing a barium-ferrite-coated $\gamma$-$Fe_2O_3$ magnetic powder comprising the following steps:
    (a) letting an iron-containing solution undergo a reaction to precipitate a needle-shaped $\alpha$-FeOOH phase powder;
    (b) mixing said $\alpha$-FeOOH powder with a barium-containing solution to obtain a barium-bearing $\alpha$-FeOOH powder;
    (c) filtering and stoving said barium-bearing $\alpha$-FeOOH powder;
    (d) subjecting said stoved barium-bearing $\alpha$-FeOOH powder to a first heat treatment of calcination to obtain a powder containing a barium-ferrite phase and a $\alpha$-$Fe_2O_3$ phase;
    (e) subjecting the resultant powder of step (d) to a second heat treatment to reduce said $\alpha$-$Fe_2O_3$ phase of said powder to a $Fe_3O_4$ phase; and
    (f) subjecting the resultant powder in step (e) to a third heat treatment to oxidize said $Fe_3O_4$ phase of said powder to a $\gamma$-$Fe_2O_3$ phase.

2. A method as claimed in claim 1, wherein said iron-containing solution is a ferrous chloride solution of about 0.5M.

3. A method as claimed in claim 1, wherein said iron-containing solution is a ferric chloride solution of about 0.5M.

4. A method as claimed in claim 1, wherein said $\gamma$-$Fe_2O_3$ magnetic powder is needle-shaped.

5. A method as claimed in claim 1, wherein the step (a) includes a sub-step of utilizing a NaOH solution to let said iron-containing solution precipitate said α-FeOOH needle-shaped phase powder.

6. A method as claimed in claim 5, wherein said NaOH solution is an aqueous solution of about 2.5M.

7. A method as claimed in claim 5, wherein said iron-containing solution and said NaOH solution are rapidly mixed.

8. A method as claimed in claim 7, wherein volumes of said iron-containing solution and said NaOH solution are substantially equal.

9. A method as claimed in claim 8, wherein the step (a) further includes a sub-step of introducing air bubbles during a mixing of said iron-containing solution and said NaOH solution for about 200 minutes in order to precipitate said needle-shaped α-FeOOH powder.

10. A method as claimed in claim 9, wherein the step (a) further includes sub-steps of cleaning up said α-FeOOH powder with deionized water, and filtering and stoving said α-FeOOH powder.

11. A method as claimed in claim 1, wherein said barium-containing solution is a $Ba(NO_3)_2$ solution of about 0.1–0.3M.

12. A method as claimed in claim 11, wherein a volume of said $Ba(NO_3)_2$ solution is adequately selected to let a Fe/Ba mole ratio of said α-FeOOH powder be about from 8 to 50.

13. A method as claimed in claim 12, wherein the Fe/Ba mole ratio is from about 10 to 44.

14. A method as claimed in claim 1, wherein the step (b) includes a sub-step of applying an ultrasonic vibration at about 25° C. for about 20 minutes to said needle-shaped barium-bearing α-FeOOH powder.

15. A method as claimed in claim 14, wherein said first heat treatment process of calcination is conducted at about 810°–890° C. in air for about 1–16 hours.

16. A method as claimed in claim 15, wherein said first heat treatment process is conducted at about 840°–880° C. in air for about 4–14 hours.

17. A method as claimed in claim 16, wherein the resultant powder after said first heat treatment process includes a barium-ferrite magnetic phase, and an α-$Fe_2O_3$ phase.

18. A method as claimed in claim 17, wherein said second heat treatment process is conducted at about 280°–370° C. in a flowing gas of hydrogen and nitrogen, being in a volume ratio of 1:1, and being saturated with water vapor at a rate of 1 to 15 ml/min for about 0.5–3 hours.

19. A method as claimed in claim 18, wherein said second heat treatment process is conducted at about 300°–350° C. in said flowing gas at a flow rate of about 2 to 9 ml/min for 1–2 hours.

20. A method as claimed in claim 19, wherein said third heat treatment process is conducted at about 330°–390° C. in air for 1–5 hours.

21. A method as claimed in claim 20, wherein said third heat treatment process is conducted at about 340°–380° C. in air for about 2°–3 hours.

22. A method as claimed in claim 20, wherein the finally obtained magnetic powder after said third heat treatment process has a coercivity of about 330–3600 Oe, a saturation magnetization of about 47–70 emu/g, a squareness ratio of about 0.46–0.61 before being magnetically aligned, a particle size of about 100–200 nm, an aspect ratio of about 3–8, and a temperature coefficient of coercivity of about −0.07 to −0.1%/° C., and includes a γ-$Fe_2O_3$ phase and a Ba-ferrite magnetic phase.

23. A method as claimed in claim 22, wherein coercivity and saturation magnetization of the finally obtained magnetic powder is modified by adjustment of a Fe/Ba ratio thereof.

24. A method as claimed in claim 23, wherein coercivity and saturation magnetization of the finally obtained magnetic powder is modified by adjustment of conditions of said first, second, and third heat treatment processes.

* * * * *

UNITED STATES PATENT AND TRADEMARK OFFICE
CERTIFICATE OF CORRECTION

PATENT NO. : 5,366,761
DATED : November 22, 1994
INVENTOR(S) : Chin, et al

It is certified that error appears in the above-indentified patent and that said Letters Patent is hereby corrected as shown below:

On the cover page, Item [54] and Column 1, line 3, delete the word "POWER" and substitute therefor --POWDER --.

Signed and Sealed this

Twenty-fifth Day of April, 1995

Attest:

BRUCE LEHMAN

*Attesting Officer*     *Commissioner of Patents and Trademarks*